(12) United States Patent
Hsieh et al.

(10) Patent No.: US 6,761,313 B2
(45) Date of Patent: Jul. 13, 2004

(54) XD MEMORY CARD ADAPTER

(75) Inventors: Hsiang-An Hsieh, Hsin Tien (TW); Wen-Tsung Liu, Hsin Tien (TW)

(73) Assignee: Carry Computer Eng. Co., Ltd., Taipei (TW)

( * ) Notice: Subject to any disclaimer, the term of this patent is extended or adjusted under 35 U.S.C. 154(b) by 5 days.

(21) Appl. No.: 10/246,538

(22) Filed: Sep. 19, 2002

(65) Prior Publication Data

US 2004/0041024 A1 Mar. 4, 2004

(30) Foreign Application Priority Data

Aug. 28, 2002 (CN) ........................................ 91213467 U

(51) Int. Cl.$^7$ .................................................. F06K 7/08
(52) U.S. Cl. ...................... 235/451; 235/441; 235/492; 235/487
(58) Field of Search ................................ 235/451, 492, 235/441, 487

(56) References Cited

U.S. PATENT DOCUMENTS

| | | | | |
|---|---|---|---|---|
| 3,863,050 A | * | 1/1975 | Brugger et al. ............. 235/380 |
| 4,675,516 A | * | 6/1987 | Guion ........................ 235/441 |
| 5,034,599 A | * | 7/1991 | Hirata ........................ 235/438 |
| 5,206,486 A | * | 4/1993 | Stephens et al. .............. 235/51 |
| 5,296,692 A | * | 3/1994 | Shino ........................ 235/486 |
| 5,526,233 A | * | 6/1996 | Hayakawa ................... 361/737 |
| 5,679,945 A | * | 10/1997 | Renner et al. .............. 235/492 |
| 5,752,857 A | * | 5/1998 | Knights ...................... 439/638 |
| 5,872,353 A | * | 2/1999 | Reichardt et al. ............ 235/441 |
| 6,165,021 A | * | 12/2000 | Bourne ........................ 439/630 |
| 6,315,205 B1 | * | 11/2001 | Bates, III ................... 235/479 |
| 6,360,954 B1 | * | 3/2002 | Barnardo ..................... 235/492 |
| 6,454,164 B1 | * | 9/2002 | Wakabayashi et al. ....... 235/380 |
| 6,491,216 B1 | * | 12/2002 | May ........................... 235/375 |
| 6,557,754 B2 | * | 5/2003 | Gray et al. .................. 235/375 |
| 6,581,122 B1 | * | 6/2003 | Sarat ......................... 710/301 |
| 6,581,830 B1 | * | 6/2003 | Jelinek et al. .............. 235/441 |

* cited by examiner

Primary Examiner—Thien M. Le
Assistant Examiner—Allyson N. Sanders
(74) Attorney, Agent, or Firm—J. C. Patents

(57) ABSTRACT

The XD memory card adapter of the present invention is comprised of an adapter board, a first pin set, a second pin set and a plurality of connecting lines; it can be used in cooperating with a memory card reading/writing device. The memory card reading/writing device has at least an insertion slot having therein a memory card electric interface, and is characterized by that: the adapter board can be inserted into the insertion slot to make connection of the first pin set with the memory card electric interface in the insertion slot; and the adapter board is provided on the side in opposition to the first pin set with the second pin set, the first pin set is connected with the second pin set via the connecting lines. When an XD memory card is inserted into the insertion slot, the input/output pins of the XD memory card can be electrically connected with the second pin set, and is communicated with the first pin set through the connecting lines to thereby render the reading/writing device to proceed data writing and reading on the XD memory card.

8 Claims, 7 Drawing Sheets

XD MEMORY CARD ADAPTER

BACKGROUND OF THE INVENTION

1. Field of the Invention

The present invention is related to an XD memory card adapter, and especially to such an adapter rendering a reading/writing device to proceed writing and reading on an XD memory card to thereby increase the function of the reading/writing device.

2. Description of the Prior Art

Flash memory cards (to be in abbreviation hereinafter as memory cards) developed in the recent years are light, thin and small, they have the superior features of high storage capacity, vibration durability, repeated memorizing for many times etc., and are widely applied in the field of IA (Information Appliance) and many portable digital products. For example, nearly all the popular products including personal digital assistants (PDA), digital cameras (DSC), digital walkmans (MP3 Players) etc. in the markets use the memory cards as storage media.

There is no uniform standard or specification presently in the art of memory cards in the whole world presently. Related products that are well known include at least: PC ATA cards, CF cards (Compact Flash cards), SM cards (Smart Media cards), MMC cards (MultiMedia cards), MS cards (Memory Stick cards) and SD cards (Secure Digital cards) etc.; and not only are multifactorial, but also have their respective predominance in the markets. For the consumer public, this results that a plurality of memory cards can not be effectively and commutatively used among portable digital products and computer systems as well as peripheral equipment of the computers, thereby the consumers not only are inconvenient in using, but also are quite limited in selection of using digital products in the future.

And more, following progressing of the science and technology, memory cards tend to be developed continuously in pursuance of the requirement of the markets. For example, CF cards are divided into Type I and Type II (with different thickness); and an "XD memory card" provided by a manufacturer recently has the same specifications as those of the SM cards, except that the size thereof is largely reduced as compared with the SM cards (the size of an SM card is: 45×37×0.76, while the size of an XD memory card is 20.0×25.0×1.7). This results that, although there are multiple support products for the SM card specification, the products can not support the newly developed "XD memory cards" due to inconsistence of specification of size, to the consumers, it may provide a new selection, but it also inadvertently increases inconvenience of intercommunication among data.

In view of this, the inventor of the present invention developed the "XD memory card adapter" of the present invention to eliminate the above stated problems by connecting an "XD memory card" to a given memory card reading/writing device via the present invention.

As shown in FIG. 1, memory card reading/writing devices 1 sold in the markets each has an insertion slot 2 with a plurality of electric interfaces (not shown) for insertion and connection of memory cards of various specifications of size. In the conventional memory card reading/writing device shown in the drawing, the insertion slot 2 is wider on the lower part thereof and can afford insertion of memory cards like the above stated SM cards or others with larger widths. The "XD memory card adapter" of the present invention was figured out primarily for the purpose of increasing the function of the insertion slot 2 on such a memory card reading/writing device 1 with the feature of having different widths on the upper and the lower parts thereof.

Moreover, some memory card reading/writing devices 1 sold in the markets are specific for memory cards of one kind of specification. The insertion slot 2 has only a width, and is directly mounted on the housing of a device or on a digital product ( for example, a Fuji digital camera only has an insert ion slot specific for SM cards). The present invention further designed a second embodiment for such a conventional memory card reading/writing device.

SUMMARY OF THE INVENTION

The XD memory card adapter of the present invention is comprised of an adapter board, a first pin set, a second pin set and a plurality of connecting lines; it can be used in cooperating with a memory card reading/writing device. The memory card reading/writing device has at least an insertion slot having therein a memory card electric interface, and is characterized by that: the adapter board can be inserted into the insertion slot to make connection of the first pin set with the memory card electric interface in the insertion slot; and the adapter board is provided on the side in opposition to the first pin set with the second pin set, the first pin set is connected with the second pin set via the connecting lines. When an XD memory card is inserted into the insertion slot, the input/output pins of the XD memory card can be electrically connected with the second pin set, and is communicated with the first pin set through the connecting lines to thereby render the reading/writing device to proceed data writing and reading on the XD memory card.

An object of the present invention is: when the input/output pins of the XD memory card of the present invention are connected with the second pin set, the memory card electric interface in the insertion slot can execute data writing and reading on the XD memory card, so that a conventional memory card reading/writing device can support XD memory cards to increase the function of the given reading/writing device.

Another object of the present invention is: when in practicing, the adapter board can be provided thereon with an insertion slot for inserting therein a memory card; the adapter board can be inserted into the already given insertion slot on a conventional memory card reading/writing device, it is connected through a first pin set, a second pin set and a plurality of connecting lines, and thereby, the conventional memory card reading/writing device can execute data writing and reading on the XD memory card.

A further object of the present invention is: when in practicing, by taking advantage of the feature that the electric interface, communication protocol as well as the control method of an XD memory card are all of the same specifications as those of an SM card, the first pin set is made to have the positions of its pins corresponding with the electric interface with the specification of the SM card, so that the given memory card reading/writing devices obtained from the markets can support the XD memory card; they can use the already given insertion slot without the requirement of additionally making an insertion slot space for the XD memory card. Thereby, the present invention can increase function with lower cost and thereby can get an effect meeting the economic benefit.

The present invention will be apparent after reading the detailed description of the preferred example thereof in reference to the accompanying drawings.

DETAILED DESCRIPTION OF THE PREFERRED EMBODIMENT

Figure 1:
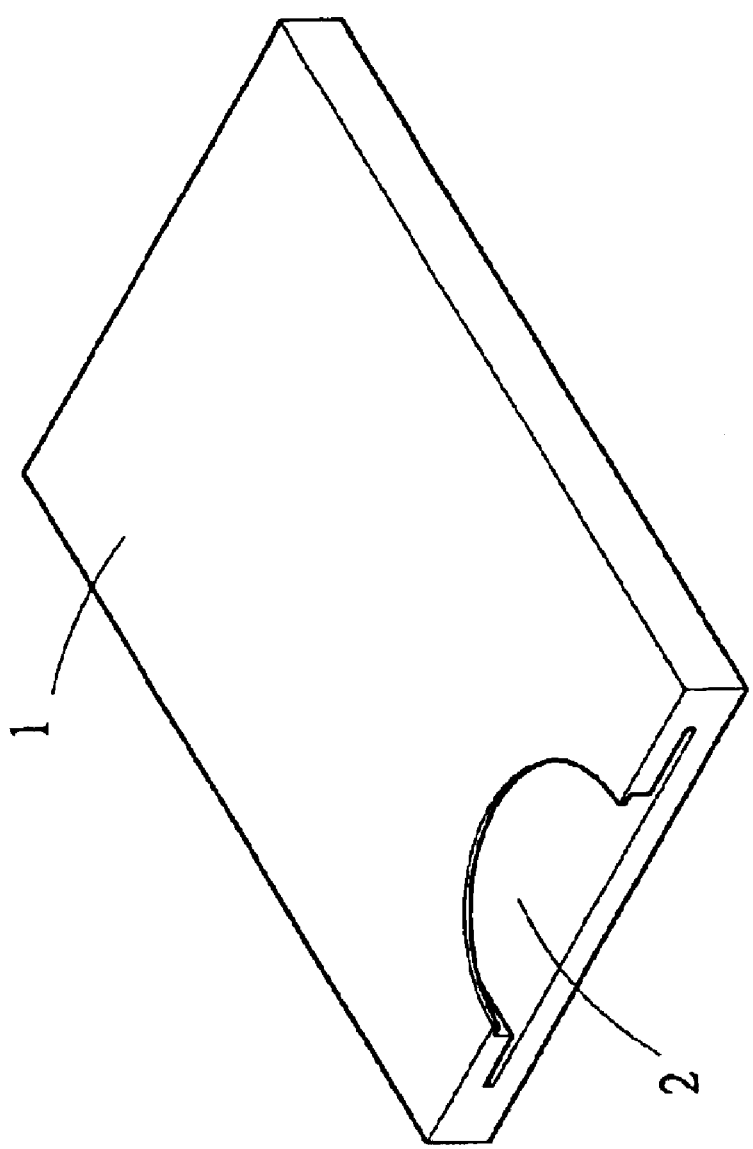
FIG. 1 is a perspective view of a conventional memory card reading/writing device.
Figure 2:
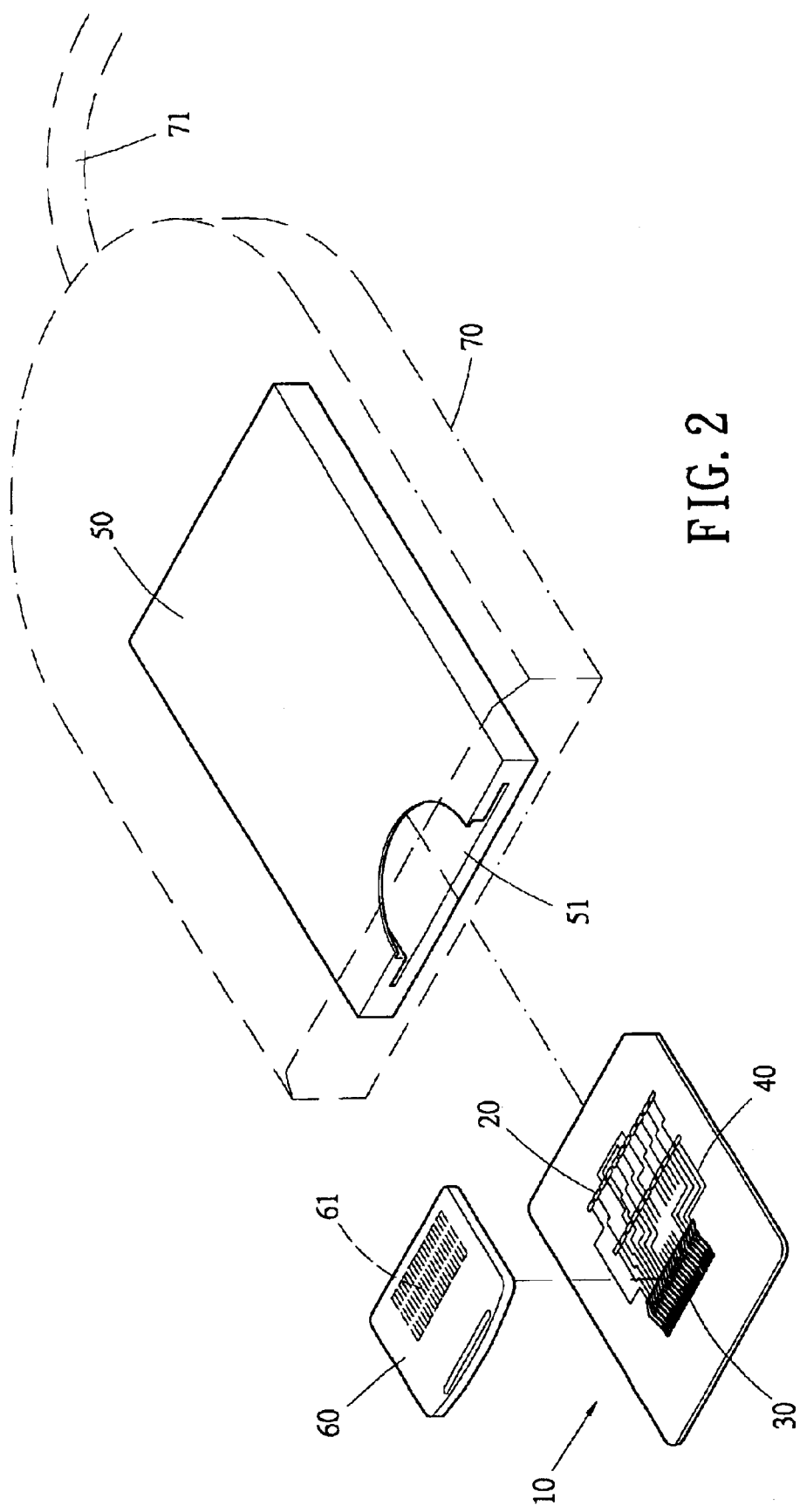
FIG. 2 is an analytic perspective view of a first embodiment of the present invention.
Figure 3:
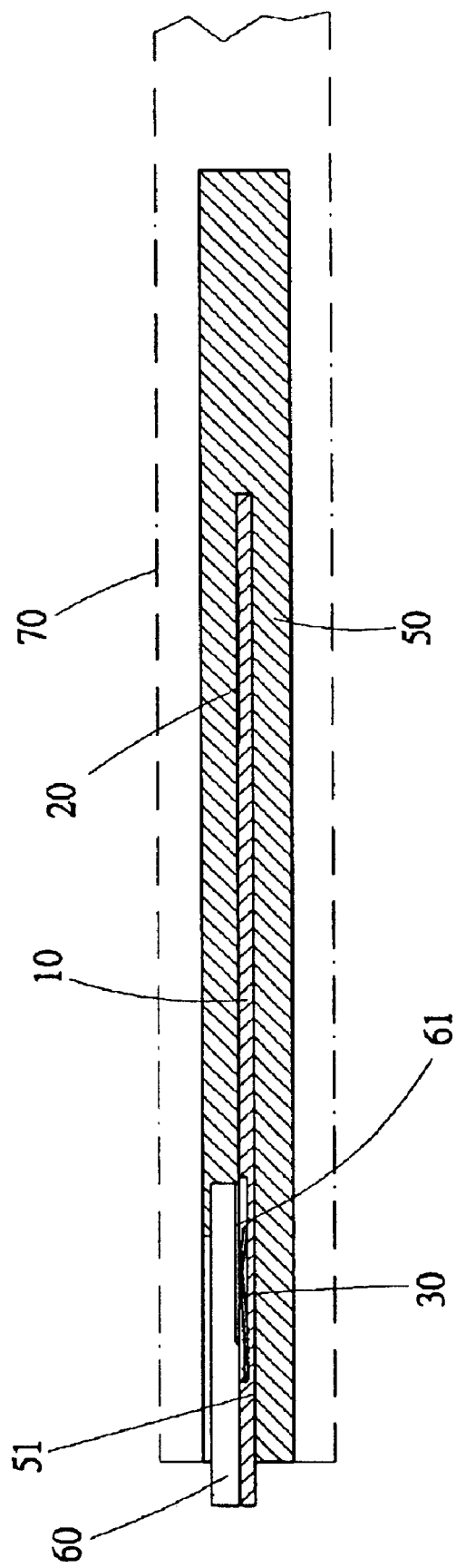
FIG. 3 is a schematic sectional view showing use of the first embodiment of the present invention.
Figure 4:
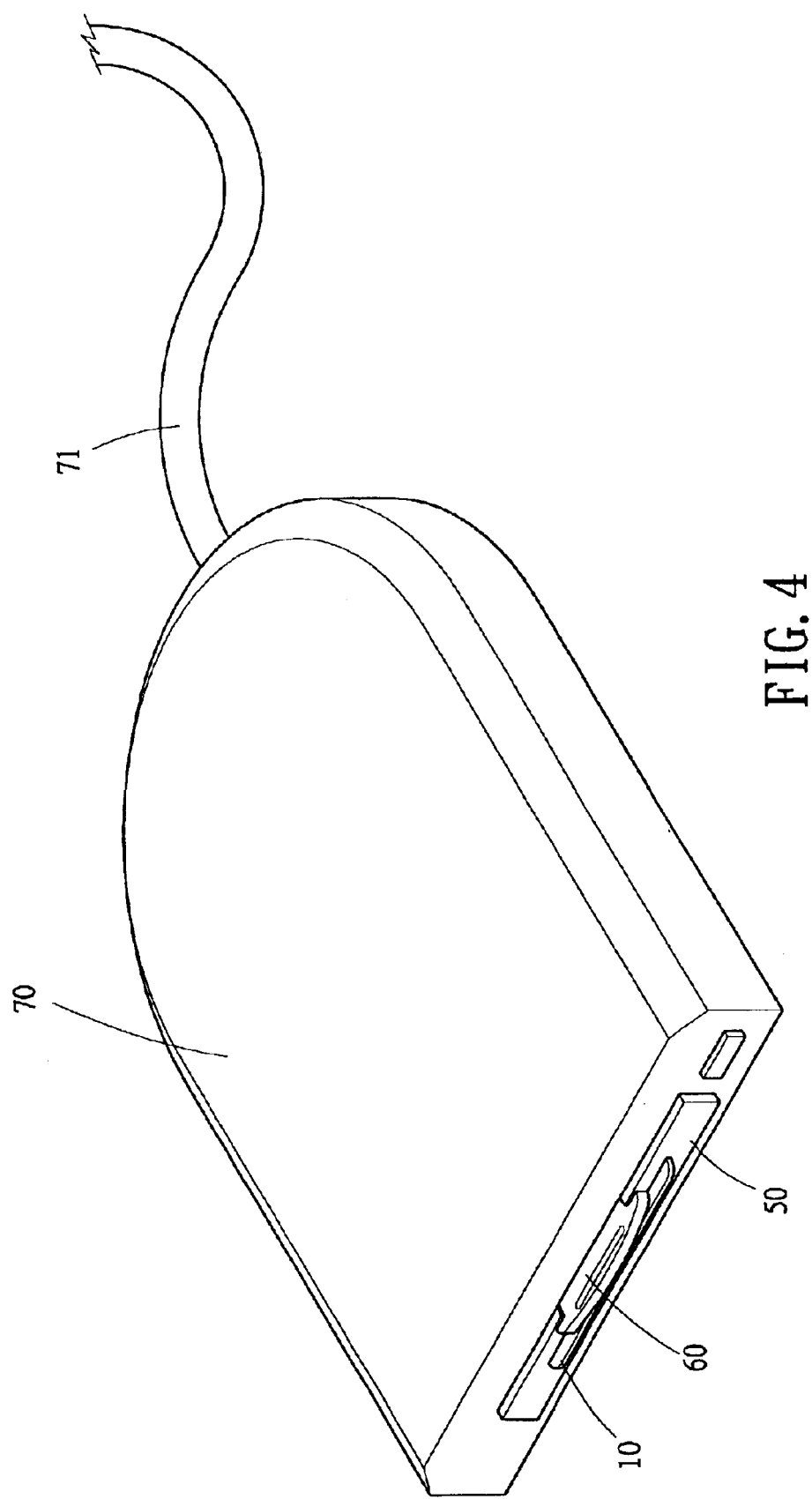
FIG. 4 is a schematic perspective view showing use of the first embodiment of the present invention.

Refining to FIGS. 2–4 showing the first embodiment of the XD memory card adapter of the present invention comprising an adapter board 10, a first set of pins 20, a second set of pins 30 and a plurality of connecting lines 40, it can be used in cooperating with a memory card reading/writing device 50. The memory card reading/writing device 50 has at least an inserting slot 51 having therein a memory card electric interface (this is a known technique and thereby is not shown in the drawings). In the drawings, the insertion slot 51 of the memory card reading/writing device 50 is narrower on the upper part than the lower part thereof and allows insertion of memory cards of various specifications.

The memory card reading/writing device is characterized in that the adapter board 10 can be inserted into the insertion slot 51 to make connection of the first set of pins 20 with memory card electric interface in the insertion slot 51. The first set of pins 20 is allocated at a front portion of the adapter board 10, far from the seconds set of pins 30 allocated at a rear portion of the adapter board 10. The first set of pins 20 is connected with the second set of pins 30 via the connecting lines 40. When an XD memory card 60 is inserted into the insertion slot 51, the input/output pins 61 of the XD memory card 60 can be electrically connected to the second pin set 30, and is communicated with the first set of pins 20 through the connecting line 40 to thereby render the reading/writing device 50 to proceed data writing and reading on the XD memory card 60.

The insertion slot 51 of the memory card reading/writing device 50 shown in the drawings is narrower on the upper part thereof for insertion of an MMC card, an MS card, an SD card or an XD memory card, and is wider on the lower part for insertion of an SM card or a CF card. When in practicing of the present invention, by taking advantage of the feature that the electric interface, communicating protocol as well as the control method of an XD memory card are all of the same specifications as those of an SM card, the size of the adapter board 10 and the positions of the pins of the first set of pins 20 meet the specifications as those of the SM card. When the adapter board 10 is inserted into the wide lower part of the insertion slot 51, the first set of pins 20 can be connected with the electric interface of the SM card in the insertion slot 51. The size of the XD memory card 60 is slightly smaller than that of an MMC card, an MS card or an SD card, so that the insertion slot 51 is large enough for insertion of the XD memory card 60. After the XD Memory card 60 is inserted into the insertion slot 51, the input/output pins 61 of the XD memory card 60 can be electrically connected with the electric interface compliant with the specification of the SM card through the second pin set 30, the connecting lines 40 and the first set of pins 20. In this way, the electric interface of the SM card executes data writing and reading on the XD memory card. Thereby, the reading/writing device for the SM card can support the XD memory card, the present invention can increase the performance of the memory card reading/writing device with reduced cost and thereby can meet an effect meeting the economic benefit. And certainly, the insertion slot 51 can also meet the specification of a CF card.

Additionally, the reading/writing device 50 can be an independent device (such as a PC card connecting device), it can be inserted into a housing 70 when in use and is connected with a computer system or some other digital product by providing a signal line 71 of the already given transmission interface (such as a USB, 1394) in the housing 70. And certainly, the reading/writing device 50 can also be built in the housing 70 (as a normally called card reading machine).

In the first embodiment shown in FIGS. 2–4, the total length of the adapter board 10 is given to meet the standard specification of size of some memory card (such as an SM card or a CF card). Therefore, connecting of the XD memory card 60 can only be completed by taking advantage of the insertion slot 51 of the memory card reading/writing device 50 which is narrower on the upper part than on the lower part thereof.

Figure 5:
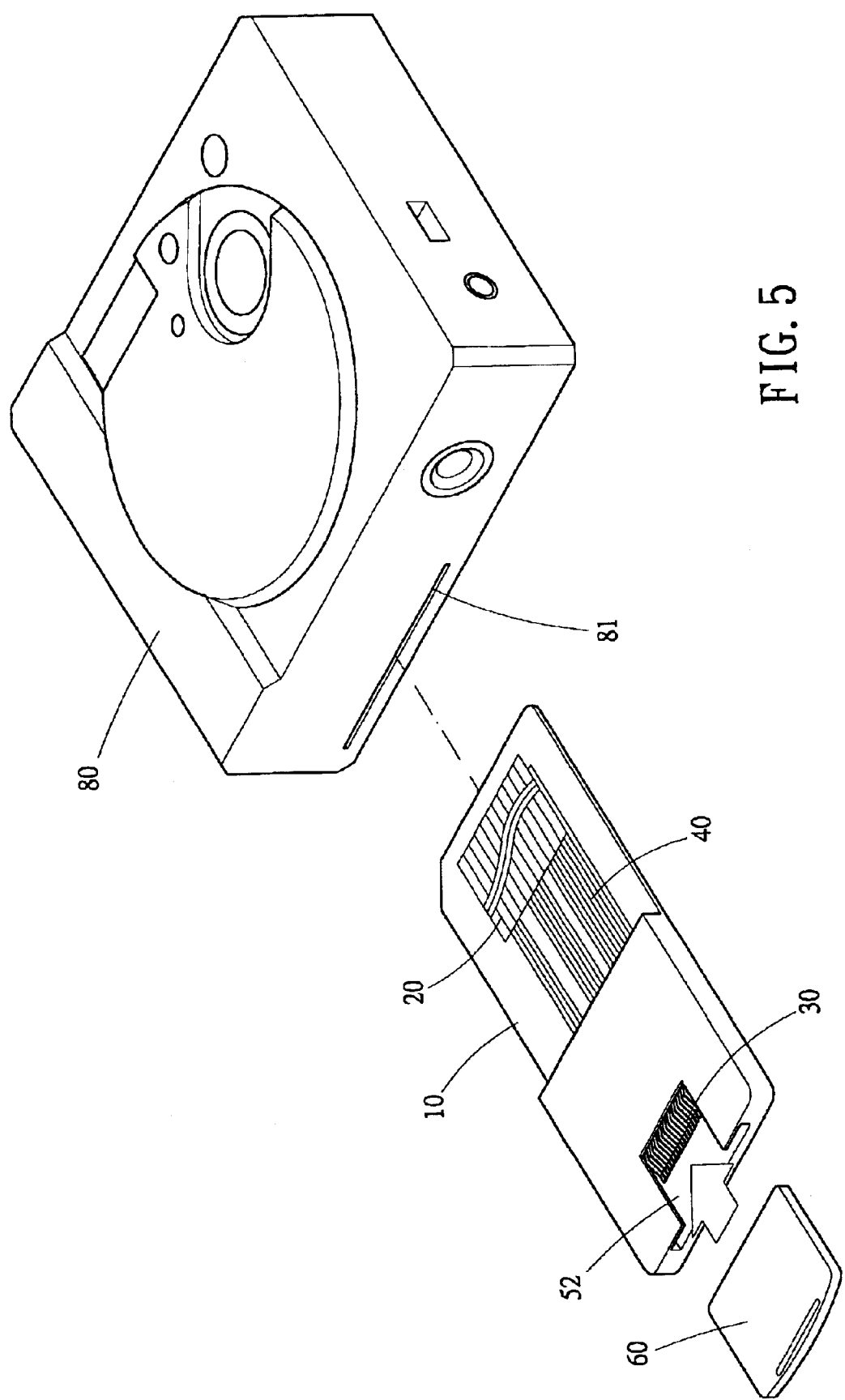
FIG. 5 is a perspective view of a second embodiment of the present invention.
Figure 6:
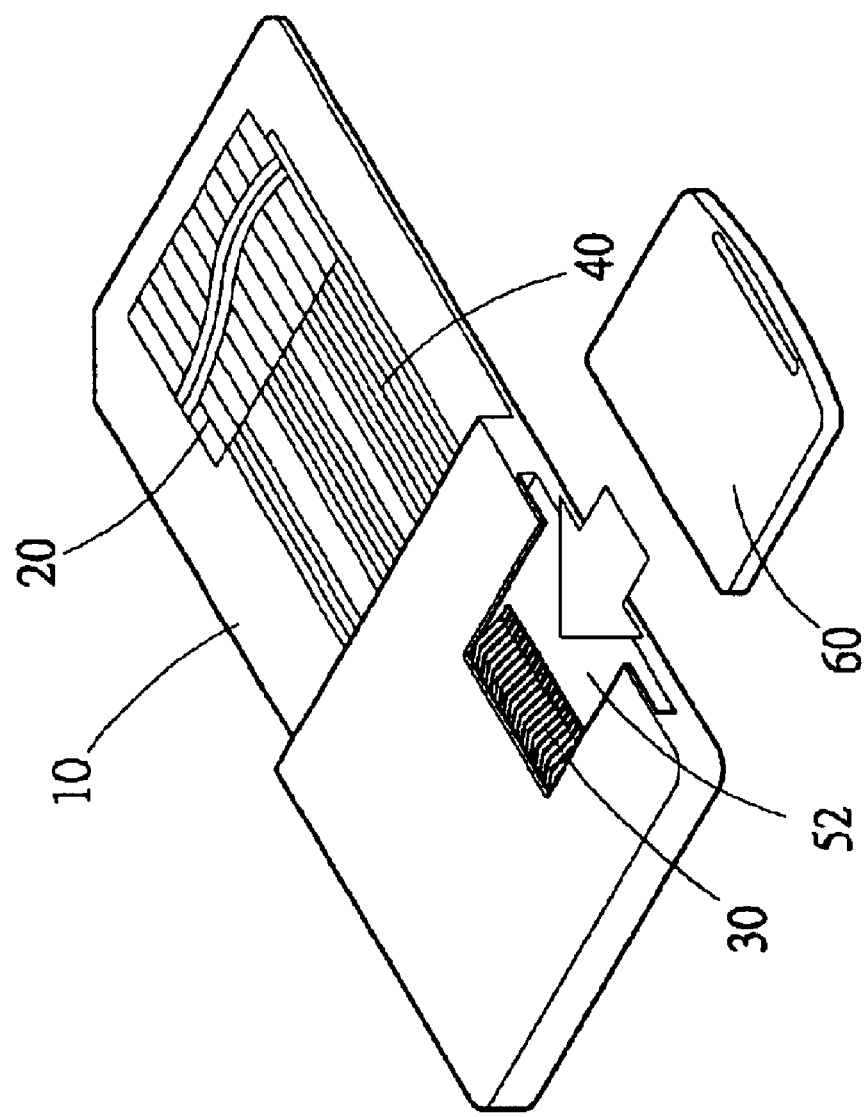
FIG. 6 is another perspective view of the second embodiment of the present invention.

When in practicing, in pursuance of the different types of insertion slot of the memory card reading/writing device, a second embodiment of the present invention can be provided as shown in FIGS. 5 and 6. The length of the adapter board 10 is slightly larger than that of the standard size specification of the memory card. The first set of pins 20 is allocated on the front portion of the adapter board 10, while the second set of pins 30 is on the rear portion of the adapter board 10 far away from the first set of pins 20. An insertion slot 52 for the XD memory card is further formed to correspond to the second set of pins 30. When the adapter board 10 is inserted into an already provided memory card insertion slot 81 of a housing or a digital product 80 (the memory card reading/writing device is built in the digital product), the first set of pins 20 can be connected with the electric interface on the memory card insertion slot 81 of the digital product 80.

At this time, by virtue that the length of the adapter board 10 is slightly larger than that of the standard size specification of the memory card, so that the insertion slot 52 for the XD memory card is exposed out of the housing or the digital product 80 to allow an XD memory card 60 to insert into the insertion slot 52 for the XD memory card. And thereby the input/output pins of the XD memory card 60 can be electrically connected with the second pin set 30, and the electric interface in the housing or the digital product 80 can proceed data writing and reading on the XD memory card 60 through the first pin set 20, the connecting lines 40 and the second pin set 30.

In other words, the second embodiment of the present invention can allow any housing or digital product 80 with the insertion slot for the XD memory card and the electric interface sold in the market to proceed data writing and reading on the XD memory card 60 without any change of design. Moreover, the insertion slots 52 as shown in the embodiments of FIGS. 5 and 6 are provided on the adapter boards 10 and oriented in two different directions respectively in pursuance of the different requirements of space.

Further, in these embodiments, the length of the adapter board 10 is slightly larger than that of the standard size specification of the memory card, the standard size specification of the memory card is, in addition to that of an SM card, that of an MMC card, an MS card or an SD card etc.

Figure 7:
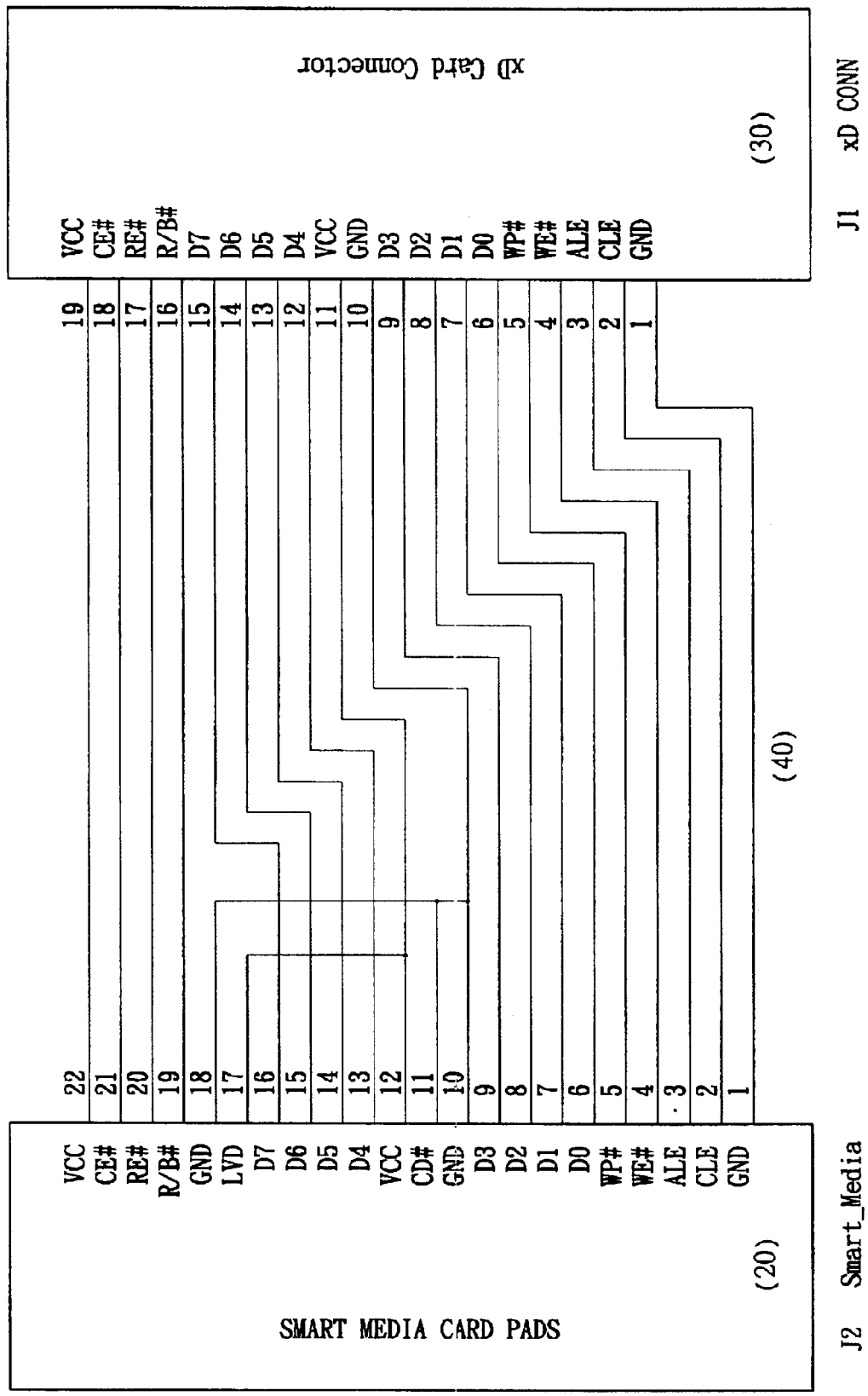
FIG. 7 shows an electric circuit allocation diagram of the first pin set, the second pin set and the connecting lines of the present invention.

Additionally, as shown in FIG. 7, by virtue that the configuration of electric interface, communication protocol as well as the control method of an XD memory card are all of the same specifications as those of an SM card, the positions of the first set of pins 20 meets the specifications as those of the SM card, while the positions of the second set of pins 30 meet the specifications as those of the XD memory card, and it needs only to connect the connecting lines 40 with the corresponding pins on the first set of pins 20 and the second set of pins 30. The reading/writing device for the SM card already provided in the markets can support the XD memory card, and thus economic benefit can be obtained.

The names of the elements composing the present invention are only for illustrating the technique content of the preferred embodiments of the present invention, and not for giving any limitation to the scope of the present invention. It will be apparent to those skilled in this art that various equivalent modifications without departing from the spirit of this invention shall fall within the scope of the appended claims.

What is claimed is:

1. An XD memory card adapter comprising an adapter board, a first set of pins, a second set of pins and a plurality of connecting lines, said adapter is used in cooperating with a memory card reading/writing device, said memory card reading/writing device has at least an insertion slot having therein a memory card electric interface; said XD memory card adapter is characterized in that:

said adapter board is adapted to insert into said insertion slot to allow connection of said first set of pins which is allocated a front portion of said adapter board to said memory card electric interface in said insertion slot; said second set of pins being allocated at a rear portion of said adapter board away from the first set of pins, and connected to said first set of pins via said connecting lines; when an XD memory card is inserted into said insertion slot, the input/output pins of said XD memory card are electrically connected with said second set of pins, and is communicated with said first set of pins through said connecting lines to perform data writing and reading on said XD memory card.

2. The XD memory card adapter as in claim 1, wherein the size of said adapter board and the position of pins of said first set of pins meet the standard specifications as those of an SM card.

3. The XD memory card adapter as in claim 1, wherein said insertion slot is different in width on the upper and the lower parts thereof, the wider part allows insertion of said adapter board, while the narrower part allows insertion of said XD memory card.

4. The XD memory card adapter as in claim 1, wherein said memory card electric interface meets any of specification of an SM card, an SD the an MMC card, a CF card and an MS card.

5. An XD memory card adapter comprising an adapter board and an insertion slot for an XD memory card, wherein said adapter board is adapted to insert into a memory card reading/writing device having an memory card insertion slot, and is provided with a first set of pins at a front portion of the adapter board and a second set of pins at a rear portion of the adapter board, the first and second sets of pins being connected via a plurality of connecting lines, said first set of pins being adapted to connect to an electric interface of said memory card insertion slot; and said insertion slot for an XD memory card is formed on said adapter board to correspond to said seconds set of pins, and to allow input/output pins of said XD memory card to be electrically connected with said second set of pins, the input/output pins of said XD memory card being further communicated with said first set of pins through said connecting lines to perform data writing and reading on said XD memory card.

6. The XD memory card adapter as in claim 5, wherein the length of said adapter board is slightly larger than that of the standard size specification of an SM card, said insertion slot for an XD memory card is located on the rear portion of said adapter board.

7. The XD memory card adapter as in claim 5, wherein said memory card insertion slot meets the specification of an SM card.

8. The XD memory card adapter as in claim 5, wherein said memory card insertion slot meets any of the specification of a CF card, an MMC card, an MS card and an SD card.

* * * * *